United States Patent [19]

Corr et al.

[11] 4,251,034
[45] Feb. 17, 1981

[54] SYSTEM FOR RECLAIMING PLASTIC FROM METAL PLATED PLASTIC SCRAP

[75] Inventors: Ernst F. Corr, Madison; Robert J. Munns, Glastonbury, both of Conn.

[73] Assignee: Entoleter, Inc., Hamden, Conn.

[21] Appl. No.: 3,417

[22] Filed: Jan. 15, 1979

[51] Int. Cl.³ ............................................. C02C 21/00
[52] U.S. Cl. ..................................... 241/14; 241/23; 241/24; 241/29; 241/DIG. 37; 260/2.3
[58] Field of Search ........ 241/14, DIG. 14, DIG. 37, 241/29, 152 A, 152 R, 24, 79.1, 97, 80, 60, 62, 76, 23; 260/2.3

[56] References Cited

U.S. PATENT DOCUMENTS

| 3,749,322 | 7/1973 | Reynolds | 241/14 X |
| 3,885,744 | 5/1975 | Drage | 241/29 X |
| 4,025,990 | 5/1977 | Lovette, Jr. | 241/14 |

Primary Examiner—Mark Rosenbaum
Attorney, Agent, or Firm—Nelson E. Kimmelman

[57] ABSTRACT

Chrome plated plastic scrap is chopped into small pieces and then, while subjected to sub-zero temperatures, is centrifugally impacted thereby producing a mixture of particles of chrome and plastic. Most of the chrome particles are removed by subjecting the mixture to a magnetic field. The remaining, mostly plastic particles are classified to obtain usable, predominantly plastic particles within a predetermined size range, those particles exceeding this range being, if desired, recycled for subjection to said centrifugal impacting step. The usable particles are thus reclaimed for reuse, after re-pelletizing, in extrusion or molding techniques.

10 Claims, 3 Drawing Figures

SYSTEM FOR RECLAIMING PLASTIC FROM METAL PLATED PLASTIC SCRAP

BACKGROUND OF THE INVENTION

1. Field of the Invention

This invention relates to plastic scrap reclamation and, in particular, to a system for separating metallic values from magnetic-metal-plated plastic scrap whereby the plastic can be reprocessed and the separated metal disposed of as desired.

2. Prior Art

While systems have been known which involve separation of metal wire from plastic or other insulation, such systems involved burning or milling, and have not been satisfactory to reclaim plastic, for example, from chromeplated plastic material such as ABS plastic (i.e., acrylonitrile-butadiene-styrene). Some of these prior art patents are U.S. Pat. Nos. 2,879,005 to Jarvis; 3,527,414 to Schorsch; 3,666,185 to Williams; 3,885,744; and 4,030,992 to Binger, et al.

It is therefore among the objects of the present invention to provide a system for reclaiming plastic (or metal values) from scrap plastic which has been plated with metallic metals which yields the greatest amount of reusable plastic having a minimal amount of residual impurities.

It is a further object of the present invention to accomplish these objectives at a cost which is lower than has hitherto been possible with other systems.

SUMMARY OF THE INVENTION

A method for processing plastic materials plated with magnetic metals comprising comminuting said metal-plated plastic pieces, centrifugally impacting the comminuted pieces which have been made friable in a low-temperature atmosphere, magnetically removing most of the comminuted metallic particles and classifying the rest of the particles to obtain plastic particles of a predetermined usable size range for reclamation.

DETAILED DESCRIPTION OF THE PREFERRED EMBODIMENT

Figure 1:
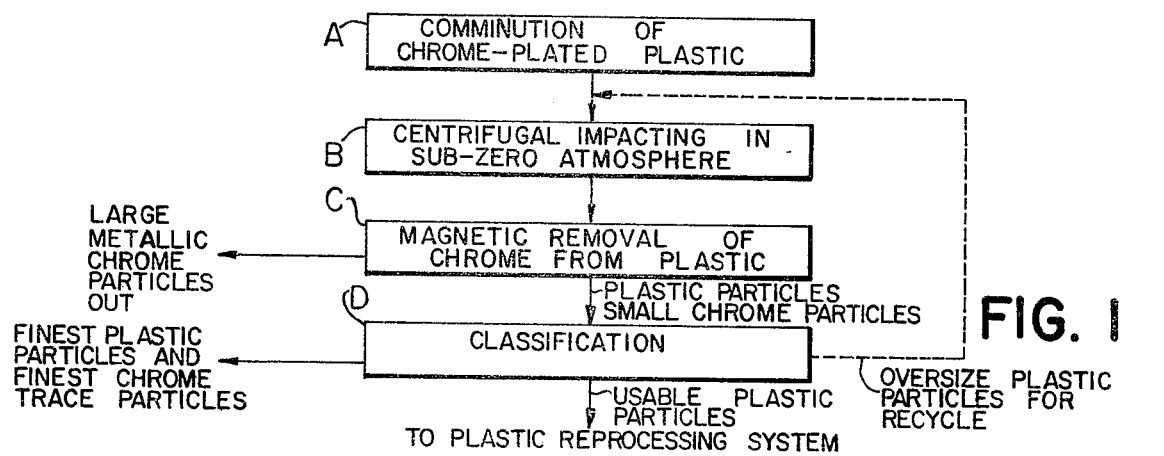
FIG. 1 is a block diagram of the main steps of the present invention.

As shown in FIG. 1, the present invention generally comprises subjecting the chrome-plated plastic material to the steps of (A) comminution, (B) centrifugally impacting the predominantly plastic particles at temperatures low enough to render them friable, (C) magnetic removal of the predominantly metallic particles from the impacted material and (D) a final classification of the impacted material to obtain a desired size range for optimum reclaiming use. Particles above this size range may be recycled back to the centrifugal impacting step (B).

Within the scope of the invention in its general form as shown in FIG. 1, many variations are possible. Comminution may be accomplished by any of a number of means such as choppers, mills, etc. Step B is well impelemented by those centrifugal impacting machines manufactured by Entoleter, Inc. of Hamden, Connecticut. Step C can be accomplished by different kinds of magnetic separators, those made by Eriez Magnetics of Erie, Pa. having been found to be quite satisfactory. Classification step D may be accomplished by screening or other conventional classification devices.

Still other variations include increasing the number of magnetic separation steps, recycling the overs from the screening (classification) step, using pneumatic conveying-cyclone systems for linking the various steps, etc. One system which has been found, after extensive testing, to reclaim the plastic is shown in FIG. 2 and will now be described in detail.

Figure 2:
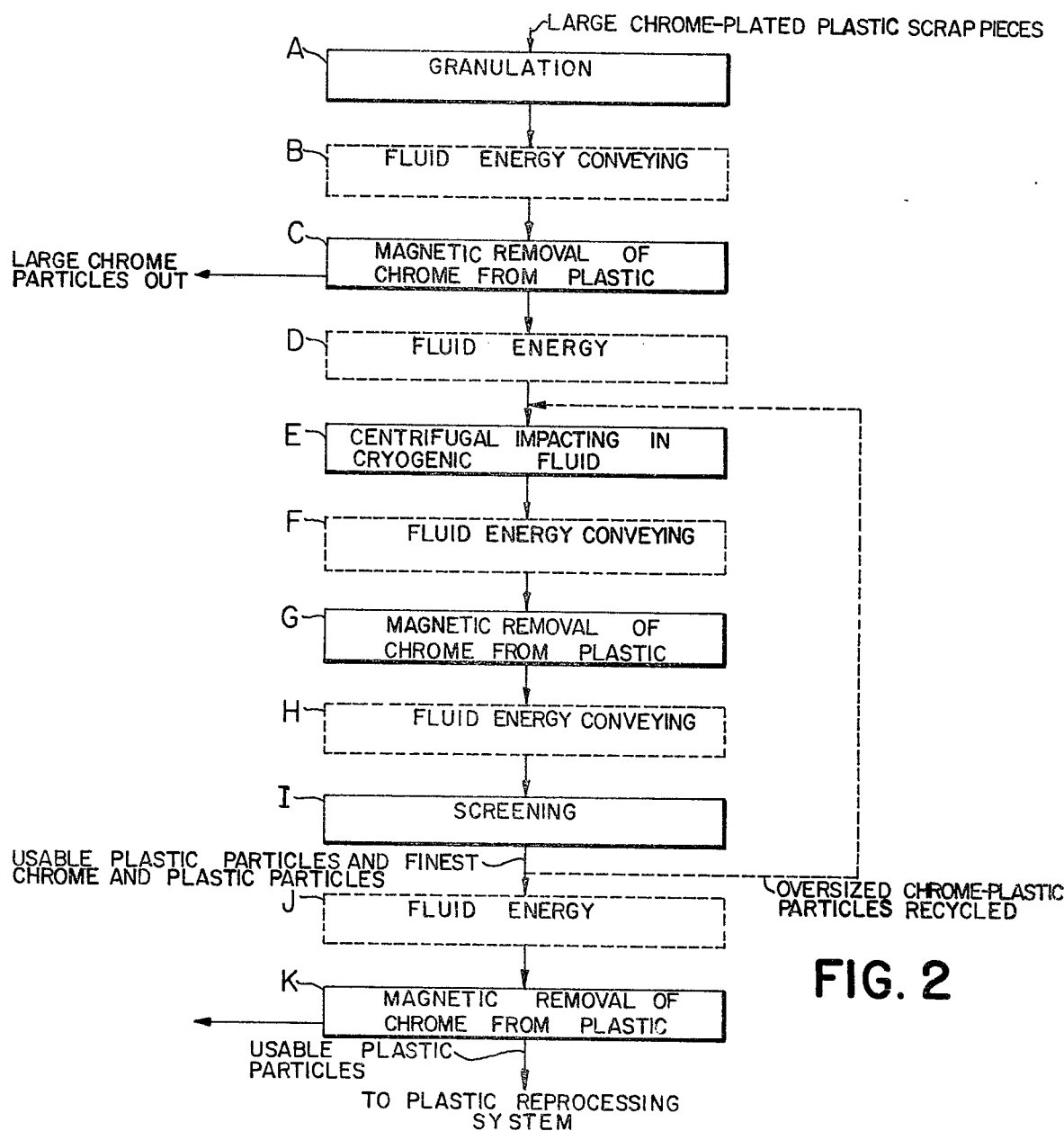
FIG. 2 is a block diagram in more detailed form of the steps in accordance with the present invention.
Figure 3:
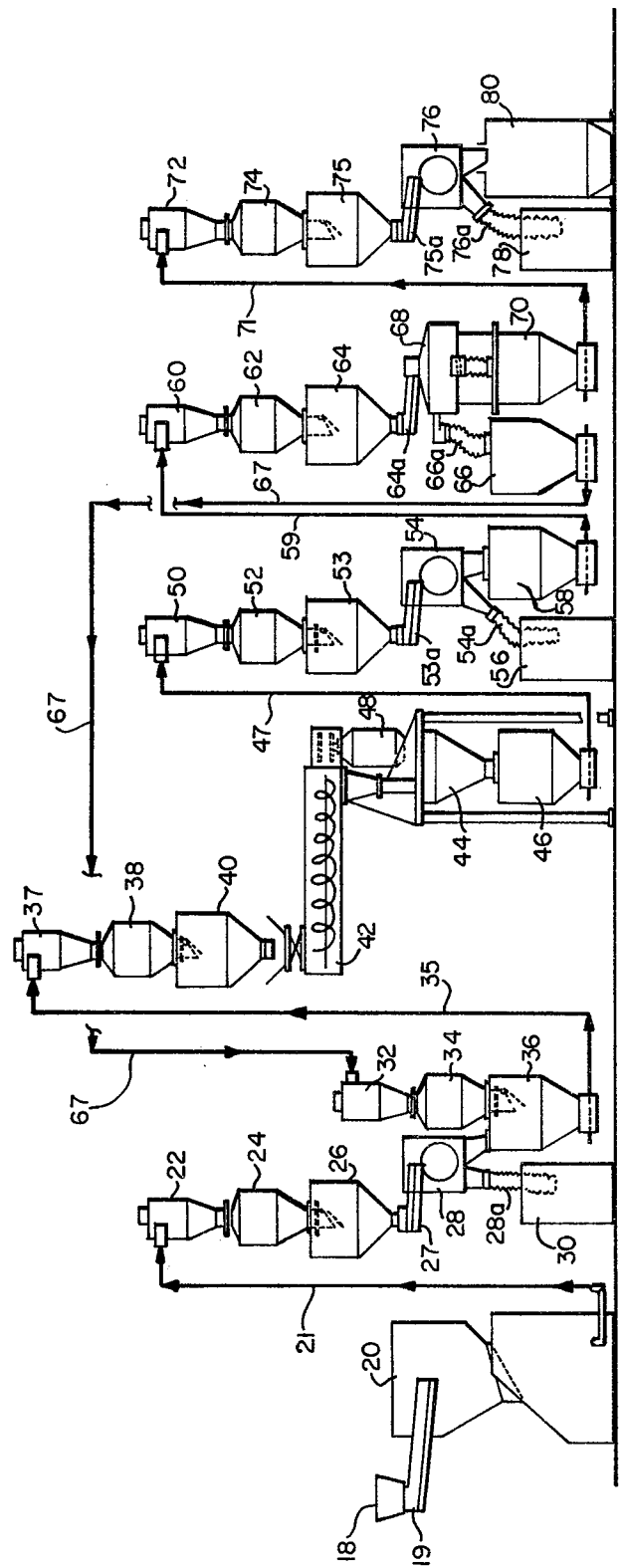
FIG. 3 is a schematic diagram of the equipment and process used in accordance with the present invention.

Referring to FIG. 2, chrome plated ABS plastic scrap which has been broken into pieces approximately in the size range of 2"–3" by a comminuter such as a large hammermill is fed to a heavy duty granulator 20 such as the Model 1639 Series 4000 marketed by the Alsteele division of Entoleter, Inc. of Hamden, Conn. which is capable of operating at the rate of 2500#/hr. The feed may be a vibratory feeder or other appropriate conveying mechanism 19. Granulator 20 reduces the pieces to about ⅜" in size having a chrome content of about 5%–10% which are discharged by gravity into an integral product bin and thence conveyed pneumatically to a cyclone 22 atop a vacuum receiver 24 and surge hopper 26 as illustrated. The cyclone generates fluid energy for the pneumatic conveyer and is not intended to perform any classification.

The heavier pieces are applied via a feeder 27 which may be of the vibratory type from the surge hopper 26 to the input of a magnetic separator such as the Eriez Model HF, CC drum available from Eriez Magnetics of Erie, Pa. This separator has a revolving drum or cylinder and a permanent magnetic scraper bar which removes the chrome-plated content that is applied to container or bin 30 through tube 28a. The predominantly plastic pieces go to surge hopper 36 because the suction produced within the cyclone 37 is applied to the pneumatic line 35.

The heavier particles gravitate downward in the hopper 36 whence they are pneumatically conveyed by line 35 to cyclone 37 which communicates with vacuum receiver 38 and surge hopper 40. Cyclone 37 generates the suction for line 35.

Conveyer 42, which may be a model 6C-PCB-MC-2 sold by Air Products & Chemicals, Inc., of Allentown, Pa., is fitted with thermostatic controls which monitor the temperature of a cyrogenic fluid such as liquid nitrogen in the interior of the conveyor housing. While temperatures only as low as −50° F. have been successfully used, the preferred temperature of the conveyer interior is typically −200° to −250° F. although it may actually go down to −320° F.

In any case, within less than about one minute, the pieces are made extremely friable and are then applied to a centrifugal impacting mill 44 such as the Model 27 mill manufactured by Entoleter, Inc. of Hamden, Conn. This mill may be used with a Series 30,27" diameter Entoleter rotor having stator impactors arranged at 45° relative to the radius of the rotor. As much as 2000 lbs/hr. can be processed by this mill whose impacting action causes the metal to be separated from the plastic due to their respectively different thermal shock and impact properties. By gravity, the milled particles descend into a hopper 46 whose lower end is pneumatically coupled to the input of a cyclone 50 via line 47.

The particles proceed by gravity downwardly through vacuum receiver 52 and surge hopper 53 via a feeder 53a into another magnetic separator 54 of the permanent magnet type. This may also be a revolving drum type separator manufactured by Eriez similar to separator 28 previously discussed. Approximately 7–8% of the input to separator 28 is metallic and when removed proceeds via tube 54a to a bin 56 while about 92% of the input falls into the surge hopper 58 and thence is pneumatically conveyed via line 59 to the input of the cyclone 60 which is situated above vacuum receiver 62. As in the corresponding previous steps the plastic particles fall downward through vacuum receiver 62 into surge hopper 64.

The bottom of hopper 64a is coupled to a feeder 64a which applies the larger particles to a sizing apparatus such as the vibrating screen of the type manufactured by Eriez, for example, Model C-362-V. Particles above the 30–40 mesh size are recycled via tube 66a, the hopper 66 and a pneumatic conveyer line indicated schematically at numeral 67 to the input to cyclone 32 for eventual reapplication to the centrifugal impacting mill 44 via cryogenic screw conveyer 42.

Those pieces in the 30–40 mesh range, which may be as much as 82–85% of the input to the screen 68, pass into the surge hopper 70 and thence are pneumatically conveyed by line 71 to the cylcone 72 where the plastic particles are subjected to centrifugal force and proceed downward through vacuum receiver 74 and surge hopper 75 to a feeder 75a coupled to the input of a third magnetic separator. It can be electromagnetic separator 76 such as the electromagnetic Model IMR manufactured by Eriez. The field of this separator is adjustable. Of the input to the separator 76, 93% is typically plastic particles whereas 7% are metal particles. The metal particles are removed via tube 76a to a bin 78 whereas the plastic particles proceed downward into the hopper 80 for refabrication into molded or extruded products. In the system described the final output may have less than 1% metal retained in or on the plastic particles to be repelletized.

What is claimed is:

1. A method for processing plastic materials plated with magnetic metals to obtain desired metal values or plastic, comprising:
   a. comminuting said plastic materials plated with magnetic metals,
   b. centrifugally impacting said comminuted materials in a cryogenic fluid thereby producing a mixture of particles of magnetic metal dislodged from said plastic and particles of said plastic substantially free of said plating,
   c. magnetically removing most of said dislodged magnetic metal particles from said mixture, and
   d. classifying said mixture from which said metallic particles have been extracted to obtain at least one fraction of essentially metal-free reclaimed plastic particles of a predetermined size.

2. The method according to claim 1 wherein said step (d) also produces a second fraction comprising particles of said plastic larger than said predetermined size to which residual amounts of said plating still adhere and recycling them for subjection to said centrifugal impacting step.

3. The method according to claim 1 wherein the finest particles present in the output of a predetermined one or ones of said processing steps are removed by fluid energy classification before application of that output to the next successive processing step.

4. The method according to claim 3 wherein said fluid energy is also used to convey the output of said predetermined step or steps to the input of the next successive processing step.

5. The method according to claim 1 with the addition of a second magnetic metal removal step between said (a) and (b) steps.

6. The method according to claim 5 with the addition of a third magnetic metal removal step after said (d) step.

7. A method for recovery of plastic or metal valves from pieces of plastic which have been plated with a magnetic metal, comprising the steps of:
   (a) granulating said pieces of plastic,
   (b) magnetically removing metallic particles from said granulated pieces,
   (c) centrifugally impacting at a predetermined sub-zero temperature the product of step (a) from which said metallic particles have been removed,
   (d) subjecting the product of said centrifugal impacting step to a second magnetic removal of metallic particles,
   (e) screening the product of said second magnetic removal step (d) to obtain predominantly metal-free plastic particles of a predetermined usable size range, and
   (f) subjecting said usable particles to a third magnetic removal step whereby residual metallic particles are removed.

8. The method according to claim 7 wherein said screening step also produces a second fraction of oversize metallic plated plastic particles which are recycled for subjection to said centrifugal impacting step.

9. The method according to claim 7 wherein fine particles in the output of any predetermined step or steps are removed by fluid energy classification.

10. The method according to claim 9 wherein said fluid energy is used to convey the product of any prior step to a succeeding step.

* * * * *